United States Patent
Redgrave et al.

[11] Patent Number: 5,839,550
[45] Date of Patent: Nov. 24, 1998

[54] BRAKE SHOE ASSEMBLY AND METHOD OF FORMING

[75] Inventors: Christopher A. Redgrave, Portage; Michael L. Silvasi, Kalamazoo; Ralph W. Larson, Olivet, all of Mich.; Steven T. Renaud, Tecumseh; Larry F. Koscielski, LaSalle, both of Canada

[73] Assignee: Easton Corporation, Cleveland, Ohio

[21] Appl. No.: 714,221

[22] Filed: Sep. 16, 1996

Related U.S. Application Data

[63] Continuation-in-part of Ser. No. 294,120, Aug. 22, 1994, Pat. No. 5,695,026.

[51] Int. Cl.⁶ .................................................. F16D 65/04
[52] U.S. Cl. ........................... 188/250 D; 188/250 G
[58] Field of Search ................................... 188/234, 242, 188/243, 250 B, 250 D, 250 G; 29/446, 460, 521; 219/121.36, 121.45, 121.63, 146.23; 228/136, 265

[56] References Cited

U.S. PATENT DOCUMENTS

| | | | |
|---|---|---|---|
| 2,541,253 | 2/1951 | House | 188/250 D |
| 2,948,360 | 8/1960 | Lupton | 188/234 |
| 2,964,142 | 12/1960 | Goepfrich | 188/250 |
| 3,265,166 | 8/1966 | Lavengood | 188/250 D |
| 4,514,613 | 4/1985 | Hill et al. | 219/121.45 |
| 4,771,870 | 9/1988 | Belk | 188/250 D |
| 4,905,800 | 3/1990 | Mathews | 188/250 D |
| 5,062,506 | 11/1991 | White | 188/329 |
| 5,261,512 | 11/1993 | Young | 188/250 B |
| 5,503,256 | 4/1996 | Redgrave et al. | 188/250 B |
| 5,523,540 | 6/1996 | Coldren et al. | 219/146.23 |

FOREIGN PATENT DOCUMENTS

0349497  1/1990  European Pat. Off. .

*Primary Examiner*—Robert J. Oberleitner
*Assistant Examiner*—Chris Schwartz

[57] ABSTRACT

A brake shoe assembly is formed by precision stamping a net shaped web blank out of steel forming a series of tabs projecting outward therefrom, stamping a corresponding table member provided with tab receiving apertures, and bending the table member into a semi-cylindrical segment. The web blank and the table are assembled causing the web tabs and table apertures to be interlocked securely locating the parts temporarily together. The cooperating tabs and projections are then permanently joined together using a hot staking process which quickly heats, radially deforms and self quenches the tab to metallurgically strength the joint.

19 Claims, 6 Drawing Sheets

BRAKE SHOE ASSEMBLY AND METHOD OF FORMING

RELATED CASES

This application is a continuation-in-part of commonly owned, utility patent application Ser. No. 08/294,120, filed Aug. 22, 1994, entitled "BRAKE SHOE ASSEMBLY FORMED USING HOT STAKING METHOD", now U.S. Pat. No. 5,695,026.

TECHNICAL FIELD

The present invention relates generally to brake shoes for use in rotary drum motor vehicle brakes and more particularly to a method for enhanced reliability and cost effective manufacture thereof.

BACKGROUND ART

Rotary drum brakes are commonly used in motor vehicles, from everyday passenger cars to trucks and large off-road industrial vehicles. A rotary drum brake mechanism has two major frictionally cooperating parts; a rotary drum which is typically affixed to the vehicle wheel and a pair of brake shoes mounted on a support plate carried by the vehicle's suspension. In order to brake a wheel and the associated brake drum, the brake shoes are shifted by an actuator relative to the support plate to cause the frictional surface on the outer periphery of the brake shoes to engage the cylindrical surface of the brake drum. The resulting braking force is transmitted through the brake shoes to the vehicle suspension via the support plate carrying the brake shoes.

As a result of wear, it is necessary to periodically replace the brake shoes and/or the frictional material provided thereon. Due to the large number of brake shoes typically required in a motor vehicle, and as a result of the necessity to periodically replace or rebuild brake shoes, it is highly desirable to minimize the cost of brake shoe assembly. Due to the safety aspects of the brake, enhanced reliability is also very desirable. Brake shoes, however, are required to provide a very strong structure having precisely defined surfaces for mounting the brake shoes on the plate and the associated brake actuator.

Brakes shoes are typically formed in generally symmetrical pairs, with each shoe having a semi-cylindrical outer surface covered with a friction material. The friction material is typically mounted on a table member metal plate formed into a semi-cylindrical shape generally corresponding to the contour of the associated brake drum. Radially inboard and securely affixed to the table member is a web member, typically a stamped steel plate forming an arcuate segment having a pair of ends. The ends of the brake shoe webs cooperate with the brake actuator and a stationary support pin affixed to the support plate enabling the brake actuator to simultaneously bias the two brake shoes into engagement with the brake drum when desired.

In the case of heavy duty brake shoes, the manufacturing process involves the attachment of web and table members by means of a high energy joining process. This process (typically welding) produces considerable distortion of the web and table members, due to the heat involved in the welding process. To mitigate this distortion, which is deleterious to the function of the brake, it is necessary to perform a re-strike (coining) operation to the shoe. This process reforms the cylindrical outer surface of the shoe. However, this process also changes the location of the shoe web first and second ends that are used in operation of the brake. Therefore, it is necessary to machine the shoe web first and second ends to create accurate location points relative to the outer surface of the shoe. Additionally, in conventional processes, it is commonly necessary to machine these ends to create a finished surface as the rough edged web stampings are not adequate for this purpose.

It is the primary object of this invention to eliminate the need for post assembly processing of the brake shoe assembly, thereby reducing the total cost of manufacturing said shoes. It is also the intent of this invention to improve the reliability and durability of the shoe which will add value to the end user of the brake shoe.

It is also an object of the present invention to fabricate the brake shoe assembly without need for use of expensive steel alloys or extra or pre or post forming heat treating processes.

SUMMARY OF THE INVENTION

Accordingly, a brake shoe assembly of the present invention is formed by stamping from steel a net-shaped web blank of generally arcuate shape having first and second ends and an outer semi-cylindrical edge. The outer edge of the web blank is provided with a plurality of upstanding tabs extending radially outward therefrom. A table member is similarly formed of steel having a semi-cylindrical shape corresponding contoured to the semi-cylindrical edge of the web and provided with a plurality of apertures corresponding in size and location to the upstanding tabs of the web blank. The tabs and apertures facilitate temporary attachment of the web blank and table member to maintain precise alignment therebetween while a permanent attachment is being formed. The table member and webs are permanently attached together by permanently adjoining the web blank and table at the intersections of the plurality of the web blank tabs and corresponding table apertures. The joint is formed using a hot staking process having a controlled time and temperature schedule resulting in the formation of martensite within the tab thereby increasing joint strength. The resulting joint does not extend beyond the outer semi-cylindrical surface of the table member eliminating the need of post-joining machining of the table member semi-cylindrical outer surface.

BEST MODE FOR CARRYING OUT THE INVENTION

Figure 1:
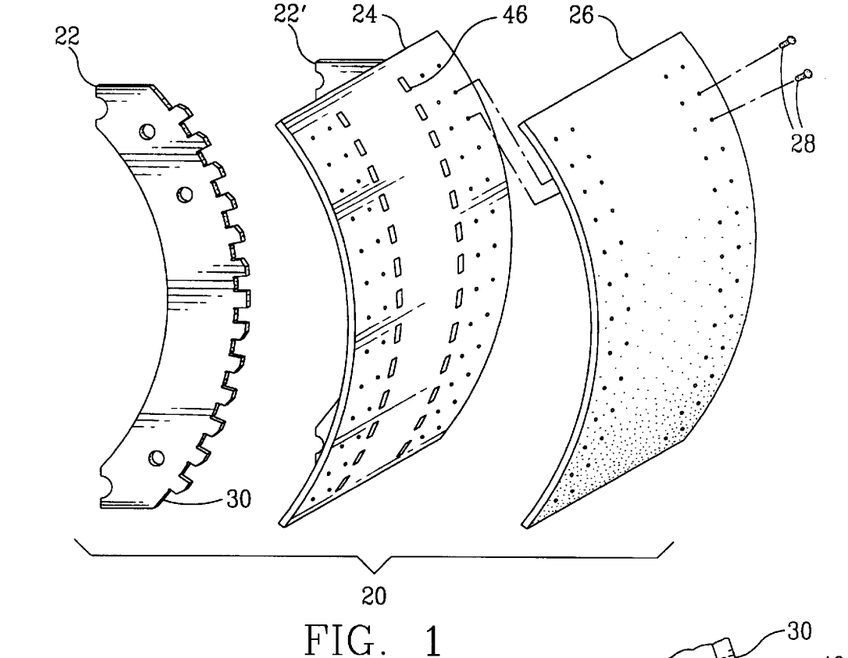
FIG. 1 is an exploded perspective view of a brake shoe assembly.
Figure 2:
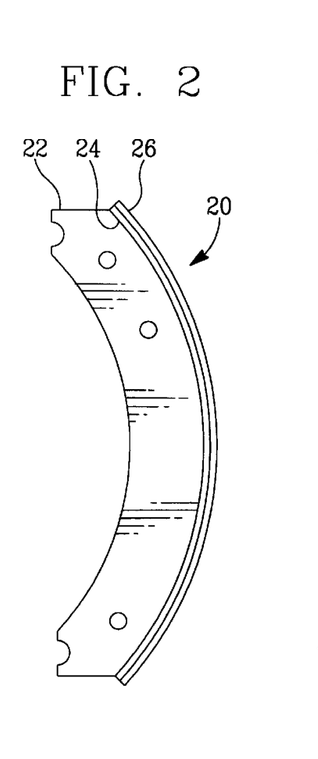
FIG. 2 is a side elevational view of a brake shoe assembly.
Figure 3:
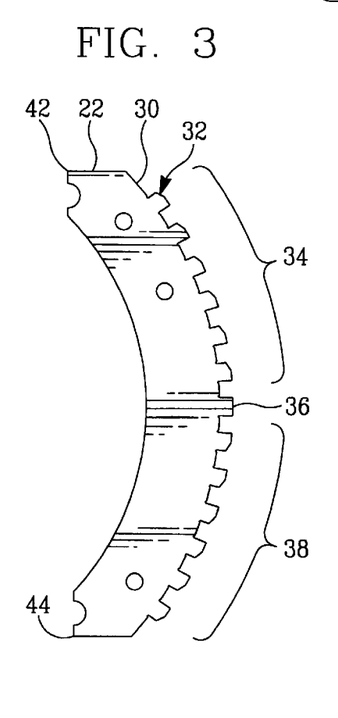
FIG. 3 is a side elevational view of a web blank.
Figure 4:
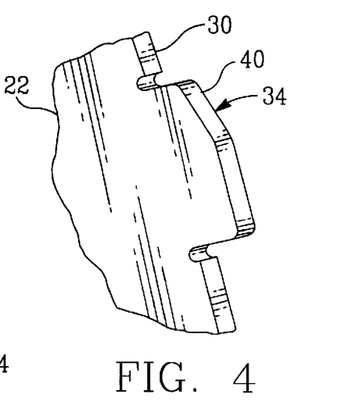
FIG. 4 is an enlarged perspective view of a web blank illustrating a representative upstanding tab.
Figure 5:
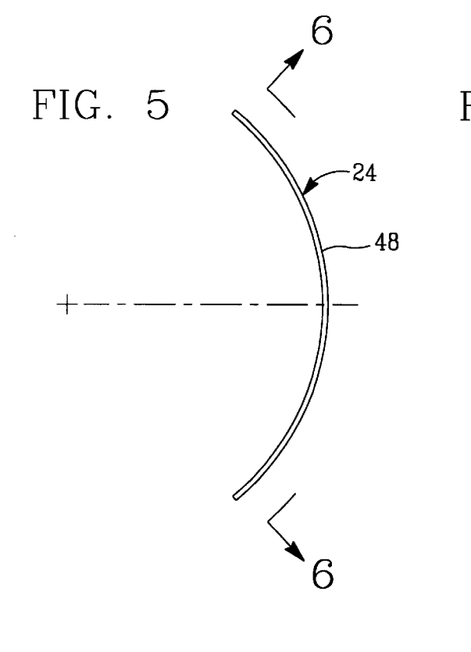
FIG. 5 is a side elevational view of a brake shoe table member.

FIG. 1 illustrates an exploded perspective view of a typical brake shoe assembly 20 of the present invention. Brake shoe 20 is made up of a pair of web blanks 22 and 22', a table member 24, a layer of friction material 26 and fasteners 28. Web blank 22 has a semi-circular outer peripheral edge 30 provided with a plurality of spaced apart tabs 32 projecting radially outward therefrom. In the preferred embodiment illustrated, there are three slightly different tab geometries corresponding to first series of tabs 34, center tab 36 and second series of tabs 38. Center tab 36 is generally rectangular in side elevation. First and second series of tabs 34 and 38 are provided with a ramp surface. In the case of the first series of tabs, the ramp surface is located on the corner of the tab nearest the first end 42 of web blank 22. The second series of tabs 38 is provided with a ramp surface located on the corner of the tab nearest second end 42 of the web blank as illustrated in FIGS. 3 and 4. Tabs 32 are sized to fit within the series of rectangular apertures 46 formed in table 24 as illustrated in FIG. 1 and FIG. 6.

Figure 6:
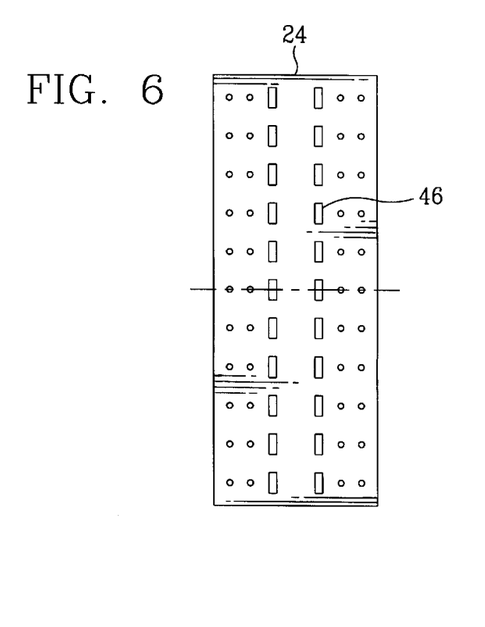
FIG. 6 is a plan view of a table member in a flat state taken along line 6—6 of FIG. 5.
Figure 7:
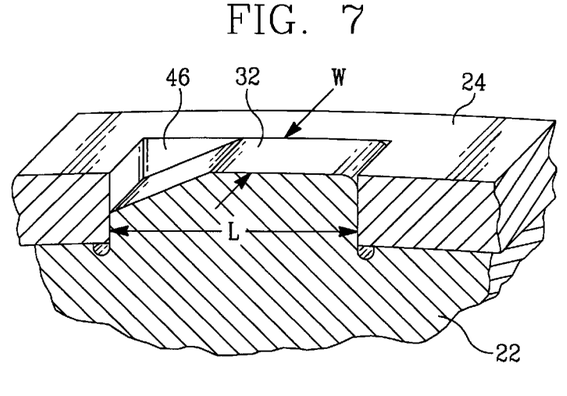
FIG. 7 is an enlarged cutaway perspective view of a cooperating tab and aperture temporarily joined together.

In the embodiment of the invention illustrated which is provided with a pair of transversely spaced web blanks, two corresponding transversely spaced apart rows of rectangular apertures are formed in the table 24 as shown in FIG. 6. The tabs on web blank 24 are of the appropriate size and orientation relative to apertures 46 to facilitate the insertion of the tabs within the apertures as illustrated in FIG. 7. The ramp surface 40 located on the first and second set of tabs 34 and 38 aid in the insertion of the tabs in the corresponding aperture. Once temporarily assembled, the tabs and apertures serve to precisely locate the webs and table prior to the permanent joining thereof. Tabs and corresponding apertures can be joined by any low heat, low distortion process. The geometry of the tab and corresponding aperture vary slightly depending upon the method of permanent joining as can be seen by comparing FIG. 7, a tab aperture intended to be welded, and FIG. 9, a tab aperture intended to be staked. Regardless of the method of permanent affixation of the web and table, the resulting joint does not substantially protrude beyond the outer semi-cylindrical surface 48 defined by table 24, and the tab function is equivalent irrespective of process.

In order to achieve the full benefit of the present invention, it is preferred that the web member and the table member both be stamped to their desired net shape. "Net shape" as used herein should be appreciated to encompass members which are substantially in their final shape although finer deviations in the final shape versus stamped net shape may occur. Of course when the tabs are deformed, they cause the tabs to interlock in the corresponding table aperture. A slight deviation in net shape will result. Similarly,, minor machining may occur on the web member without falling outside of the scope of the term "net shape". The resulting assembly can therefore be used without any significant post-assembly machining of either the outer semi-cylindrical surface 48 or the first and second ends 42 and 44 of the web blank.

To control the geometric tolerances of the web blanks and table, the parts are formed using a precision stamping process in which dimensional tolerances are closely regulated to form parts of net shape. As an alternative to a single stage of precision stamping die, a multiple stage progressive stamping operation, a fine blanking process or similar means can be utilized to carefully control the profile of the periphery of the stamped parts.

It should be appreciated that the present invention can be utilized to make brake shoes for a wide variety of brake sizes and loads.

As illustrated in FIG. 7, a typical tab projection 32 will have a length L of approximately 0.500 inches and a width W corresponding to the thickness of the steel. The corresponding aperture 46 of the table member 24 will be slightly wider than the tab projection 37 to provide installation clearance. A clearance of 0.010 inches per side is adequate, however, this dimension is not critical provided it is not too large. Once the table is bent, the clearance along the length L is reduced to preferably a line to line or slight interference fit.

The web and table member when assembled temporarily are located in a fixture (not shown). With the web and table held in the fixture, the plurality of the corresponding tabs and apertures are joined together to form a permanent attachment. Preferably, all of the welded tabs are joined together, however, in some applications it may be necessary only to join a limited number of the corresponding tabs and apertures.

Figure 8:
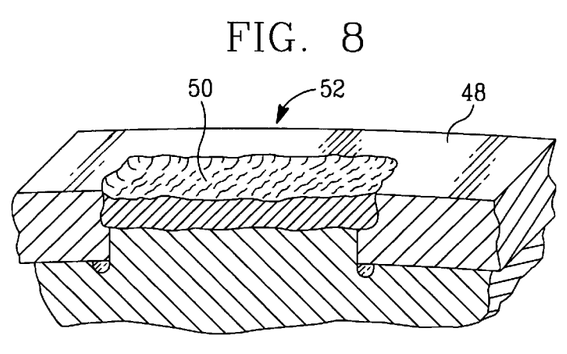
FIG. 8 is an enlarged cutaway view of a cooperating tab and aperture which have been welded together.

In the embodiment of the invention as illustrated in FIGS. 7 and 8, the tab and aperture are joined by a weldment. In FIG. 8, a weld nugget 50 securely joins the web 22 and table 24. The area weld nugget 50 is quite localized and, as a result, does not cause warping or distortion of the table and web blank. Weld nugget 50 is formed by a concentrated energy source such as a plasma or a laser beam directed at the tab and immediately surrounding table material from an energy source 52 located outward of the semi-cylindrical table outer periphery 48.

With the welds completed, the bare brake shoe assembly is finished. There is no need for post-welding processing of the outer semi-cylindrical surface or of the first and second ends of the web which cooperate with the support plate and brake actuator mechanism. At this time, the bare brake shoe can either be sold as is or assembled with friction material to form a completed ready-to-use brake shoe assembly. In such case, the bare brake shoe is first coated with a layer of anti-corrosive material. The layer of friction material 26 is affixed to the outer semi-cylindrical surface of table 24 by any currently available method. With the friction material attached, the brake shoe assembly is ready for installation in a motor vehicle.

Figure 9:
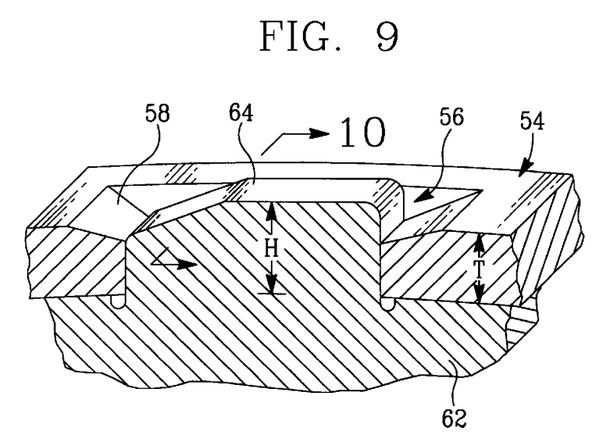
FIG. 9 is an enlarged cutaway perspective view of an alternative embodiment of a tab and aperture temporarily joined together.
Figure 10:
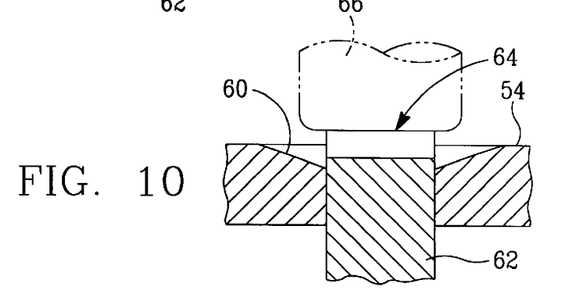
FIG. 10 is a cross-sectional end view taken alone line 10—10 of FIG. 9 with a staking punch shown in phantom outline.
Figure 11:
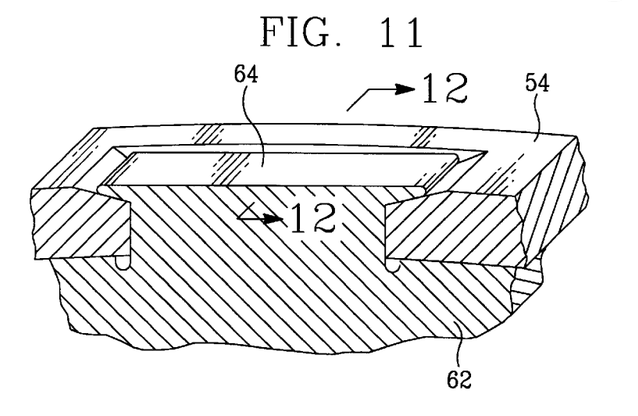
FIG. 11 is an enlarged cross-sectional view of an associated tab and table aperture which have been staked together.
Figure 12:
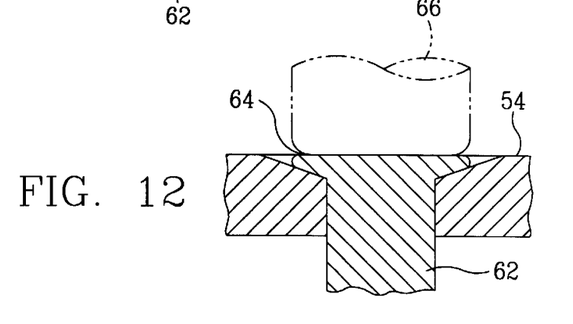
FIG. 12 is a cross-sectional end view taken along line 12—12 of FIG. 11.
Figure 13:
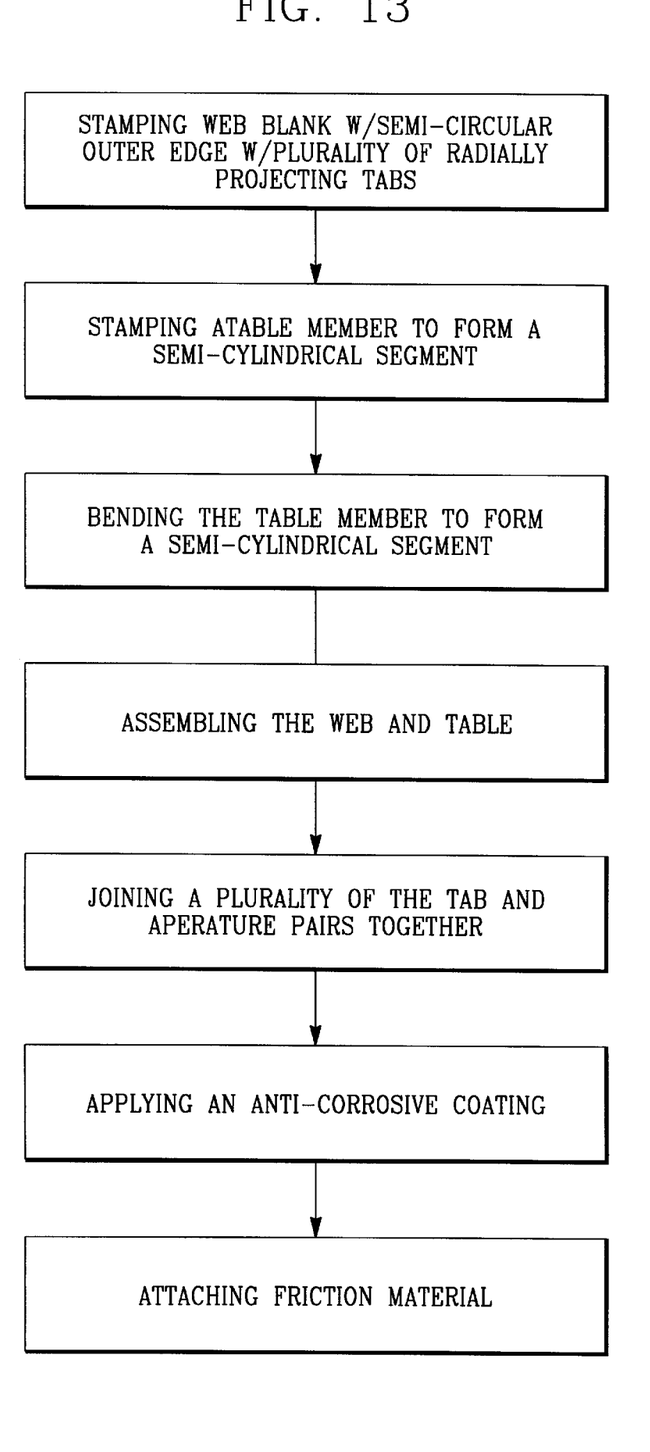
FIG. 13 is a block diagram setting forth the steps associated with manufacturing a completed brake shoe upon which friction material has been installed.

An alternative second embodiment of the invention is illustrated in FIGS. 9–12. In this second embodiment, table 54 is provided with aperture 56 having chamfered ends 58 and chamfered sides 60 as illustrated in FIGS. 9 and 10. Web blank 62 is provided with a tab 64 which is similar to tab 32 shown in FIG. 7 except for the increase in height. Tab 34 has a height H which may exceed the thickness T of table member 54. When the web and table are temporarily assembled together as illustrated in FIGS. 9 and 10, the free end of tab 64 may project above the outer cylindrical surface of table end 54 as illustrated.

With the table and web temporarily attached together and located in a fixture, a hot stake tool 66 shown in FIG. 10 will move into contact with the free end of tab 64 and begin to heat the tab. When the tab has reached the desired hot forming temperature, the hot stake tool will be extended to the position shown in FIG. 12 causing the end of the aperture to mushroom outward and to become substantially flush or possibly slightly recessed relative to the outer cylindrical surface of table 54. The resulting joint, shown in FIG. 11, forms a secure bond interlocking the tab 64 and the table 54 without causing resulting deformation or warpage of the table and web member. The resulting jointed parts form a bare brake shoe assembly which, like the brake shoe assembly described previously, can be sold as is or provided with a layer of friction material and an anti-corrosive coating.

Figure 14:
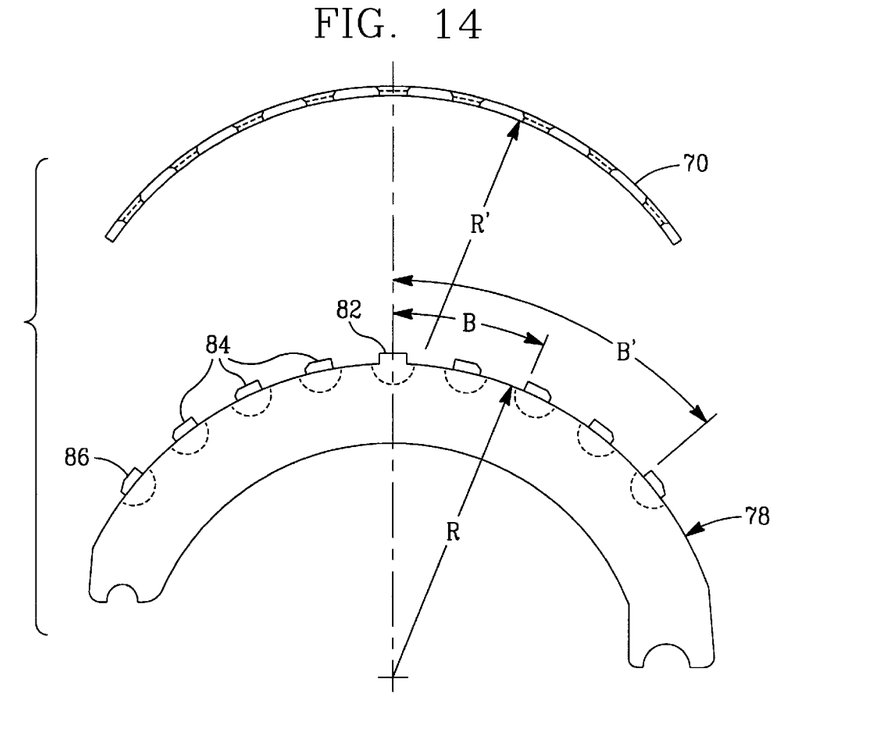
FIG. 14 is an exploded view of the web blank and table member prior to assembly.
Figure 14A:
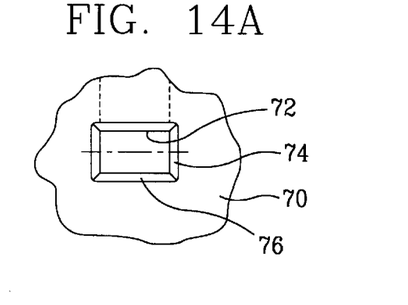
FIGS. 14a–14d are enlarged fragmentary views of the apertures and tabs formed on the table member and web blank.
Figure 14B:
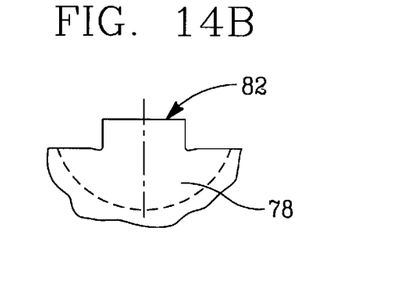
Figure 14C:
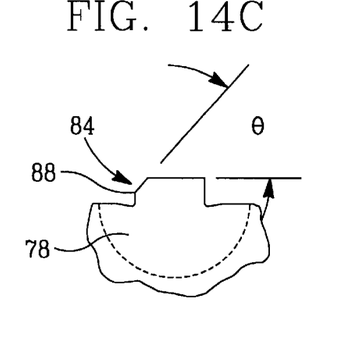
Figure 14D:
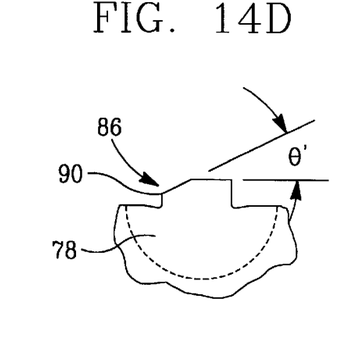
Figure 15:
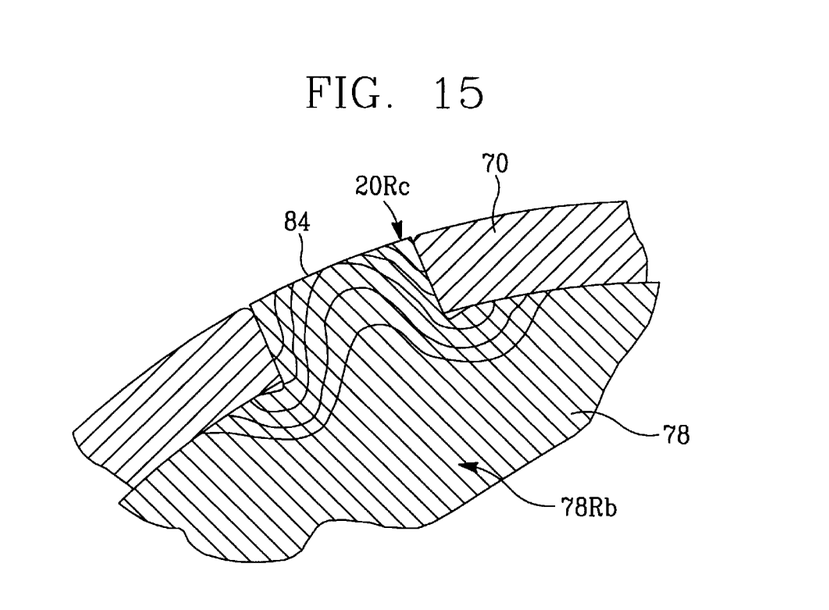
FIG. 15 is an enlarged cross sectional view of a joint illustrating the hardness change which occurs as the result of hot staking.

An alternative third embodiment of the invention is illustrated with reference to FIGS. 14–16. In this third embodiment, table 70 has a series of apertures 72 having chamfered ends 74 and sides 76 as illustrated in FIG. 14 and 14a. The web blank 78 is provided with a plurality of tabs 80 generally similar to tabs 32 shown in FIGS. 3 and 7. Tabs 80 come in three general configurations; a generally rectangular center tab 82, shown in FIG. 14b which is found on the longitudinal centerline 22 which generally bisects the web blank and table member. The tabs on opposite sides of the center line are generally a mirror image of one another. The outboard edge of the tabs located on respective sides of the center line are each provided with an inclined surface sloped toward the respective web blank end. Tab 84, shown in FIG. 14c has a relatively steep ramp angle θ of 63° while outboard most tab 14d has a shallower ramp angle θ' equal to 38°.

The height of tabs 86 and 84 at the outboard edge is reduced as a result of the ramps 88 and 90, however, the height is preferably 40%–50% of the table thickness. During assembly, the tabs and table elastically deflect as the table and web blank are assembled together. Preferably, the tab and apertures fit in a line to line or slight interference relationship when assembled, to maintain proper geometry and good thermal and electrical conductivity between the table and the web blank.

Preferably, the table member 70 is bent to achieve an inside radius R which is slightly less than the corresponding outside radius R' of the web blank semi-circular outer peripheral edge. Representative dimensions of the table and web blank 70 and 78, respectively, utilized in a truck brake application are illustrated below.

| | |
|---|---|
| Web Blank Material | SAE 1022 |
| Web Blank Thickness | 8 mm. |
| Max tab height | 4.9 m. |
| Max tab length | 14 mm. |
| Tab height (ramp side) | 2.1 |
| tab ramp angle | 53° |
| θ (tab position β = 12–37°) | |
| tab ramp angle | 38° |
| θ' (tab position β = 50°) | |
| R | 200 mm. |
| Table blank material | SAE 1008 |
| Table blank thickness | 4.5 mm. |
| Slot width (prior to forming) | 8.28 mm. |
| Slot length (prior to forming) | 14.98 mm. |
| R | 198 mm. |
| chamfer angle | 45° |
| chamfer depth | 2.0 mm. |

In this third preferred embodiment, the table member is formed of 1008 or 1010 SAE steel while web blank 78 is formed of SAE grade 1022. When using 1022 steel for the web blank, it is necessary to carefully control the time and temperature parameters of the hot staking process to change the metallurgical characteristics of the tabs to increase the martensitic content and thereby increase metal strength. As illustrated in FIG. 15, the joint once formed has the tab stakes flush or slightly below the outer semi-cylindrical surface of table 70. The tab in the region adjacent its respective end which engages the table aperture has a minimum hardness of 20 on the Rockwell C scale while the unheat-treated portion of the web has an as formed hardness of 78 on a Rockwell B scale as illustrated in FIG. 15. This is a significant change in metal hardness enabling SAE 1022 steel to be used provided staking parameters are carefully controlled.

To achieve the desired metallurgical characteristics utilizing the table member and web blank described with respect to the third embodiment, a hot staking electrode tool is oriented radially outboard of the peripheral surface of the table and the web blank and table assembly is grounded. The hot staking electrode tool is then energized a pre-determined number of cycles. In the present embodiment, 45 cycles or 0.75 seconds of power is applied into the electrode at a current of 20,000 amps. In conjunction with the (resistance) heating of the tab, an axial load is placed on the staking electrode, causing the tab to deform as illustrated in FIG. 15. Due to the very short duration of electrode power, heating is quite localized and the regions of the table and tab away from the joint act as a heat sink to quickly quench the joint once power is terminated.

Figure 16:
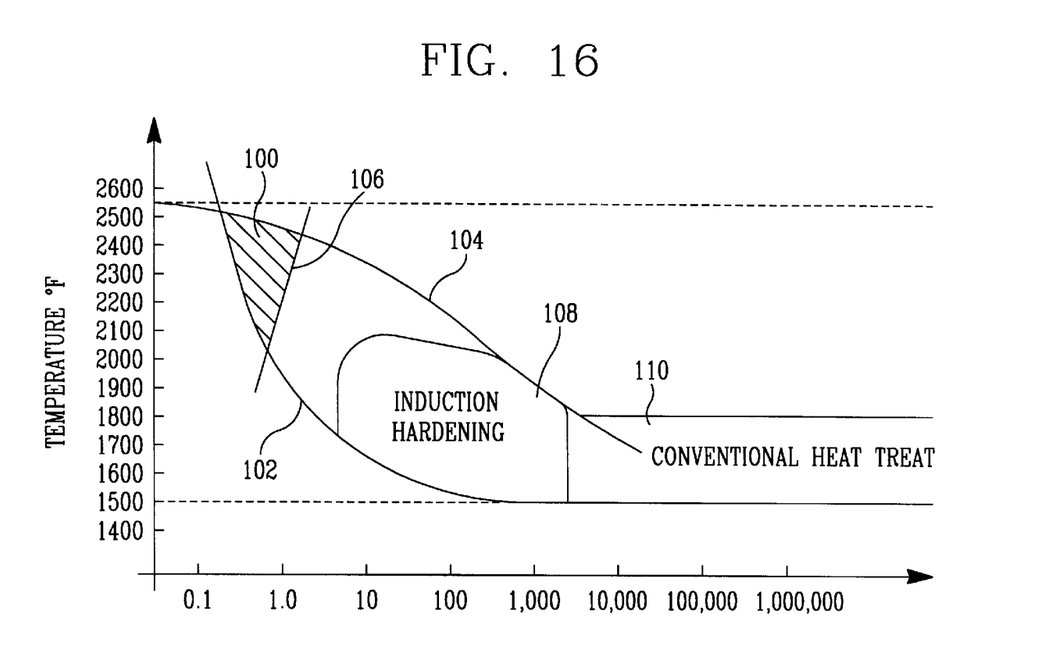
FIG. 16 is a temperature time-plot illustrating time and temperature parameters of hot staking for achieving the desired joint metallurgical characteristics.

For sufficient martensite and bainite to be formed in the joint, it is important to control the peak temperature, power and duration within a predefined envelope as illustrated in FIG. 16. The desired operating zone is illustrated by numeral 100. Zone 100 is bounded by curve 102 illustrating the minimum time necessary for formation of a sufficient amount of austenite. Boundary 104 defines a limit above which grain coarsening, incipient melting and expulsion may occur. Boundary 106 is the time limit beyond which the surrounding material will be heated too much thereby precluding the self quenching transformation of the austenite to martensite or bainite. It should be appreciated that these parameters will vary with different geometric joints and materials. One of ordinary skill in the art would need to perform routine experimentation in order to optimize the joint strength for a particular material gauge and tab size. It should also be appreciated that air jet quenching can be used to supplement the self quenching effect thereby shifting boundary curve 106 to the right in FIG. 16.

Preferably, each tab will be resistance heated less than one second and more than 0.3 seconds. The peak temperature achieved in the tab is preferably in excess of 2100 degrees and most preferably, between 2200 and 2450 degrees F.

It should be appreciated that this process happens in a very short time and it is particularly difficult to characterize precisely since the tab temperature changes so quickly, never reaching a stable temperature as in conventional heat treating. The temperature rises quickly as power is introduced and peaks at the time power is terminated. The temperature then quickly initially drops and further gradually decreases as the energy is absorbed by the surrounding material of the table and web blank. For reference purposes, the temperature/time zone 108 for conventional induction heating as illustrated in FIG. 16, as is temperature/time zone 110 for conventional heat treating to achieve furnace austenization.

It is also understood, of course, that while the form of the invention herein shown and described constitutes a preferred embodiment of the invention, it is not intended to illustrate all possible forms thereof. It should also be understood that the words used in the specification are words of description rather than limitation and various changes may be made without departing from the spirit and scope of the invention.

What is claimed is:

1. A method of forming a brake shoe assembly, said method comprising:

precision stamping out of steel a net shaped web blank having a semi-circular outer peripheral edge provided with a plurality of tabs projecting radially outward therefrom;

precision stamping out of steel a table member having a plurality of apertures formed therein sized to tightly receive and corresponding in spacing to the tabs on the web blank;

bending the table member to form a semi-cylindrical segment;

assembling the web and table causing the web tabs and table apertures to interlock, locating the parts temporarily together; and hot staking the plurality of the tab and aperture pairs together by resistance heating the tabs to a temperature sufficient to form austenite, but below a corresponding grain coarsening temperature limit, for a sufficiently short time so that the joint will be substantially self quenched resulting in the formation of martensite and bainite within the tabs thereby increasing the strength and toughness of the joints, wherein the resulting joints do not extend substantially beyond the outer semi-cylindrical surface of the table.

2. The method of claim 1 wherein the web blank is provided with a longitudinal center line bisecting the web blank into a first and second portion corresponding respectively to the first and second web blank ends, wherein a plurality of tabs located in the web first portion have a ramp surface sloped toward the web first end, and the web second portion is provided with a plurality of tabs having a ramp surface sloped toward the web second end, to facilitate an interference fit of the tabs within the apertures of the table member.

3. The brake shoe assembly of claim 2 wherein the steel used to form the web blank is hot rolled steel.

4. The brake shoe assembly of claim 2 wherein the tabs are inwardly radially compressed during hot staking causing the tabs to expand, mechanically interlocking the tabs within their corresponding table member aperture.

5. The brake shoe assembly of claim 2 wherein a plurality of the table member apertures are provided with a chamfered outboard peripheral edge to enable a plurality of the stake tabs to expand forming a mushroom head securely interlocking the web blank end and table member.

6. The brake shoe assembly of claim 2 wherein a plurality of the web blank tabs are provided with a free end having a ramp surface aiding in the alignment and assembly of the table member and web blank.

7. The brake shoe assembly of claim 2 wherein the web blank is provided with a longitudinal center line bisecting the web blank into a first and second portion corresponding respectively to the first and second web blank ends, wherein a plurality of tabs located in the web first portion have a ramp surface sloped toward the web first end and the web second portion is provided with a plurality of tabs having a ramp surface sloped toward the web second end.

8. A brake shoe assembly made by the method of claim 2.

9. The method of claim 1 wherein the tabs are resistance heated by grounding the web and table assembly and engaging an outboard end of each of the tabs with a hot staking electrode oriented radially outboard of the outer periphery of the table, to heat and radially inwardly deform the tabs by passing low voltage high amperage electrical current through the tabs for a short period of time.

10. The method of claim 9 wherein the short period of time is between 0.3 and 1.0 seconds.

11. The method of claim 9 wherein the short period of time is between 0.5 and 0.8 seconds.

12. A brake shoe assembly made by the method of claim 9.

13. The method of claim 1 wherein each tab is resistance heated for a time of less than one second.

14. The method of claim 1 wherein each tab is heated to a temperature of at least 2100 degrees F.

15. The method of claim 1 wherein during the bending step the table is bent to achieve an inside diameter which is less than that of the corresponding diameter of the web blank semi-circular outer peripheral edge.

16. The method of claim 1 wherein a flat table blank is formed during assembly into a radius matched to that of the webs by the assembly process.

17. A brake shoe assembly made by the method of claim 1.

18. A brake shoe assembly comprising:

a stamped net shaped web blank formed of steel having a generally arcuate shape, a first and second end and an outer semi-circular edge with a plurality of upstanding tabs extending radially outward therefrom; and a stamped net shape table member formed of steel defining a semi-cylindrical segment generally corresponding in contour to the web semi-circular edge, said table member having a plurality of apertures formed therein with a size and location to tightly receive the web blank tabs to facilitate the temporary attachment of the web blank to the table member during assembly;

wherein the table member and web blank are joined together at a plurality of the intersections of the web blank tabs and corresponding table member apertures by hot staking the plurality of the tab and aperture pairs together by resistance heating the tabs to a temperature sufficient to form austenite, but below a corresponding grain coarsening temperature limit, for a sufficiently short time so that the joint will be substantially self quenched resulting in the formation of martensite and bainite within the tabs thereby increasing the strength of the joints to securely attach the web blank and table member together forming a brake shoe assembly without the need for significant post joining machining.

19. A brake shoe assembly comprising:

a stamped net shaped web blank formed of hot rolled steel, the web blank having a generally arcuate shape, a first and second end and an outer semi-circular edge with a plurality of upstanding tabs extending radially outward therefrom; and a stamped net shape table member formed of low carbon steel defining a semi-cylindrical segment generally corresponding in contour to the web semi-circular edge, said table member having a plurality of apertures formed therein with a size and location to tightly receive the web blank tabs to facilitate the temporary attachment of the web blank to the table member during assembly;

wherein the table member and web blank are joined together at a plurality of the intersections of the web blank tabs and corresponding table member apertures by hot staking the plurality of the tab and aperture pairs together by resistance heating the tabs to a peak temperature above 2100 degrees F so as to form austenite, but below a corresponding grain coarsening temperature limit, with a heating time of less than 1.0 seconds so that the joint will be substantially self quenching resulting in the formation of martensite within the tabs thereby increasing the strength of the joints to securely attach the web blank and table member together without the need for significant post joining machining.

* * * * *